United States Patent [19]

Koster

[11] 4,040,307
[45] Aug. 9, 1977

[54] WORM GEAR TRANSMISSION

[75] Inventor: Marinus Pieter Koster, Eindhoven, Netherlands

[73] Assignee: U.S. Philips Corporation, Briarcliff Manor, N.Y.

[21] Appl. No.: 680,963

[22] Filed: Apr. 27, 1976

[30] Foreign Application Priority Data

May 15, 1975 Netherlands .......................... 7505699

[51] Int. Cl.² ............................................. F16H 1/16
[52] U.S. Cl. .................................................. 74/425
[58] Field of Search .......................... 74/425, 440, 409

[56] References Cited
U.S. PATENT DOCUMENTS 3,339,426  9/1967  Borggraff .............................. 74/425

Primary Examiner—Edgar W. Geoghegan
Attorney, Agent, or Firm—Frank R. Trifari; David R. Treacy

[57] ABSTRACT

A worm gear transmission having a worm wheel which is journalled in a housing and a worm rotatably journalled at one end in a bearing pivotably connected to the housing, and at the other end in a second bearing engaged by an adjustable pre-load spring which presses the worm towards the wheel. The pivotably arranged bearing is also axially displaceable and is coupled to a first member which cooperates with a second member, rigidly coupled to the housing at least in the axial direction, such that, upon axial displacement of the pivoted bearing by torque loading, one of the members undergoes transverse displacement which is coupled to vary the pre-load force in the spring.

7 Claims, 3 Drawing Figures

WORM GEAR TRANSMISSION

BACKGROUND OF THE INVENTION

1. Field of the Invention

The invention relates to a worm gear transmission comprising a worm wheel journalled in a housing and a worm which engages the wheel; and in particular to a transmission having a worm arranged between two bearings, the first bearing being pivotably connected to the housing and the second bearing being engaged by an adjustable pre-loading spring which exerts a force on this bearing pressing the worm toward the worm wheel.

2. Description of the Prior Art

An anti-backlash worm gear transmission of this kind is known from Bauelemente der Feinmechanik, Richter und Vos (1952), pp. 417–418. The play in this known transmission is eliminated by pivotally mounting the worm bearing in the housing on one end, and by loading the worm to a predetermined value at the other end, by a spring, so that the worm is pressed into the worm wheel. The value of the pre-loading force exerted by the spring must be such that the maximum force occurring on the worm during operation, opposing the spring force, is exceeded; as a result both flanks of the engaging teeth remain in contact with each other.

This means that in all circumstances the total tooth load exceeds, by an amount equal to the maximum operating load for which the pre-loading is sufficient, the value which is caused by the instantaneous operating load. Consequently, when operating load is at its anticipated maximum, the total load equals twice this maximum value; while at zero operating load the total load equals the maximum operating load.

This design has the drawback that far more wear occurs and much more frictional heat is developed than if no pre-loading force were used.

SUMMARY OF THE INVENTION

The object of the invention is to provide a worm gear transmission which is play-free, which has a comparatively high torsional stiffness and which does not involve a detrimentally high degree of wear and heat development.

To achieve this object, in accordance with the invention, a worm gear transmission has a pivotally mounted worm bearing arranged also to be displaceable in the axial direction of the worm, the bearing being further coupled to a first member which engages a second member that is connected to the housing rigidly at least in the axial direction of the worm, the two members being so arranged that displacement of the first member in the worm axial direction causes a displacement of one of the two members in a direction transverse to the worm axis, the member which is displaceable in this transverse direction being further coupled to one end of a pre-load spring whose pre-load force is changed by this displacement.

In this manner the pre-load force exerted by the spring can be varied directly, proportionally to the external load, as is further explained hereinafter.

In a preferred embodiment of the invention, the pivoting axis of the first bearing is situated in the plane which is tangent to the operating pitch circle of the worm wheel at the area of engagement of the worm and parallel to the axis of the worm. The displacement of the worm in its axial direction thus exactly equals the displacement of the pivoting axis. In accordance with a further preferred embodiment yet, one of the two members comprises a portion which cooperates with two inclined faces of the other member. Thus a displacement of the first member parallel to the worm axis simultaneously results in a displacement of one of said two members in a direction transverse to the worm axis, so that the pre-load in the spring is varied.

DESCRIPTION OF THE PREFERRED EMBODIMENTS

Figure 1A:
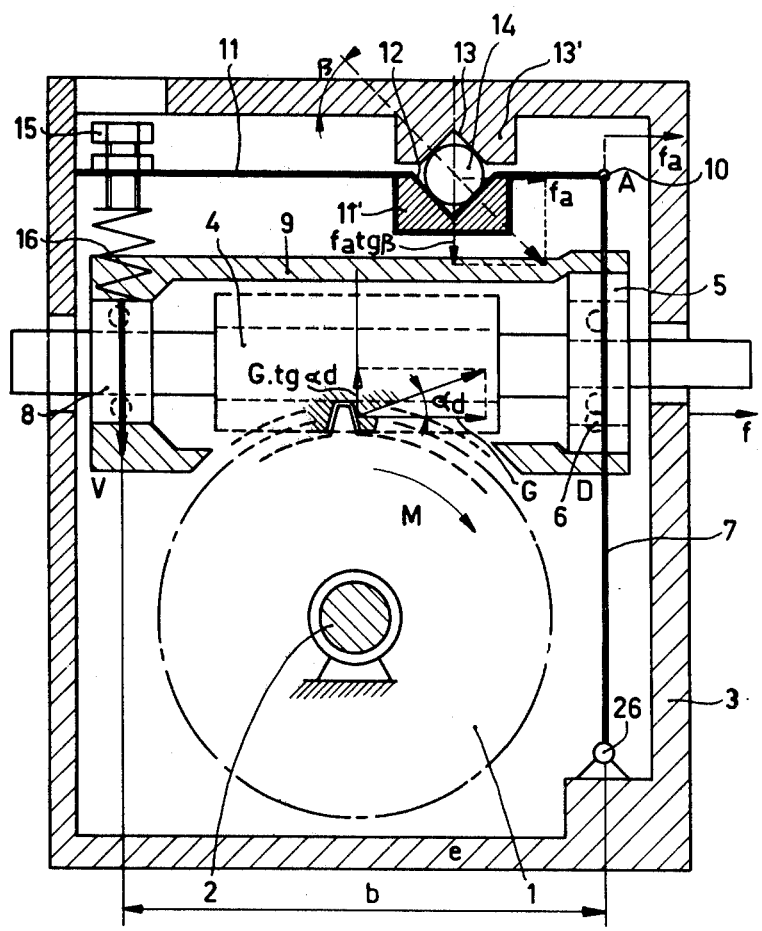
FIGS. 1a and 1b are diagrammatic sectional views of two embodiments of a transmission according to the invention in which the second member is fixed to the housing.

As shown in all the figures, the transmission comprises a worm wheel 1 whose shaft 2 is journalled in bearings which are rigidly arranged in the housing 3 and which are not shown.

The worm wheel 1 is engaged by a worm 4 which is journalled at a first end in a bearing 5 which is pivotable about a shaft 6, the shaft being attached to a lever 7 which is connected to the housing 3 at a pivot 26. The axes of the shaft 6 and the pivot 26 are parallel to the axis of the shaft 2, and lie in a plane perpendicular to the axis of the worm 4. The axis of the shaft 6 lies in a plane tangent to the pitch circle of the worm wheel 1 at the area of engagement by the worm 4 so that pivotal movement about the shaft 6 does not introduce a component of axial displacement at the area of tooth contact.

The worm 4 is journalled at a second end in a bearing 8 which is rigidly connected to the bearing 5 by a housing 9.

Figure 1B:
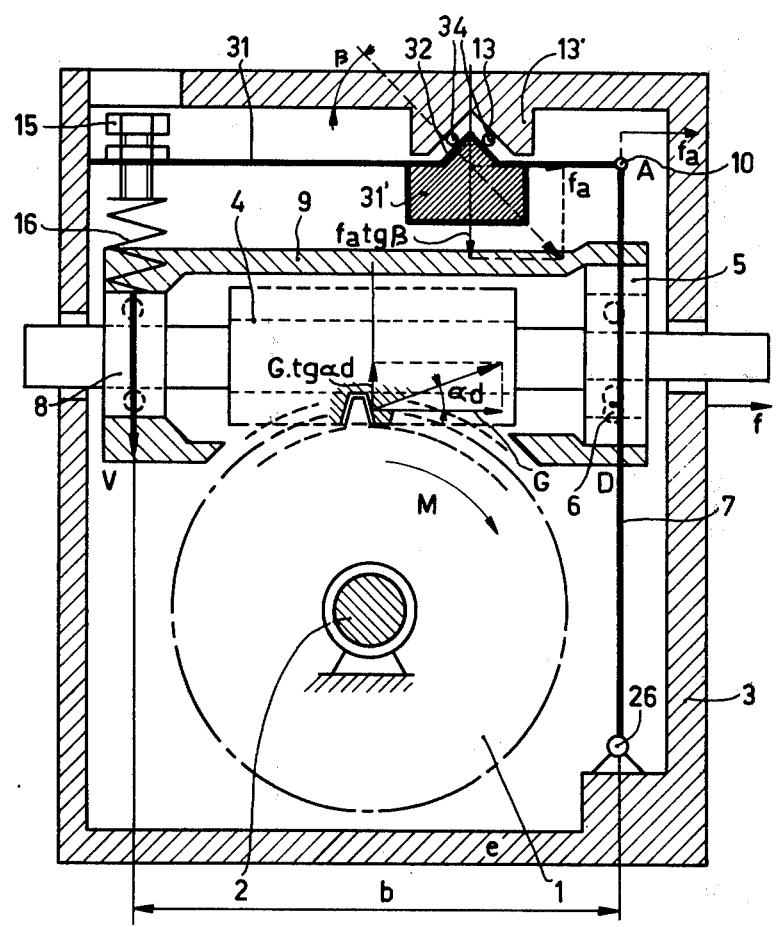

As shown in FIG. 1a, the lever 7 is connected, via a hinge 10, to a first member or lever 11 which has a first portion 11' having a vee-groove 12. The groove 12 is situated opposite a similar vee-groove 13 in a second member or housing portion 13' which is rigidly connected to the housing 3. A cylindrical roller 14 is captured between the vee-grooves. FIG. 1b shows a different embodiment in which identical parts have the same reference numerals. Instead of a vee-groove, lever 31 has a portion 31' having a vee-shaped ridge 32 which bears against two rollers 34 between the ridge and the vee-groove 13 in the portion 13'.

The end of the lever 11 or 31 accommodates an adjusting screw 15 which bears against a compression spring 16, the other end of the spring contacting the bearing 8.

The operation of this transmission is as follows. When a torque (M) is exerted on the worm wheel shaft 2 in the direction of the arrow, the teeth of the worm wheel 1 exert a force on the worm 4 which can be broken down into an axial component (G) and a radial component (G tan α). Under the influence of the axial component, the worm 4 will be axially displaced, the bearing 5, being suspended from the lever 7 on the pivoting shaft 6, then being taken along. As a result, the hinge 10 and the lever 11 or 31 connected to this hinge will also be displaced. During this displacement, the roller 14 or the rollers 34 and the vee-grooves 12 and 13 or the vee-groove 13 and the ridge 32, respectively, will also force the lever 11 or 31 downwards over a distance which is directly proportional to the displacement of the pivot 6. Accordingly, the adjusting screw 15 will also be displaced downwards over a given distance, the tension of the spring 16 then increasing by a force (V). This force (V) applied to the bearing 8 produces a moment (V$b$) about the pivot shaft 6. The worm shaft is also subject to a second moment, caused by the radial component of the tooth force (G tan $a$). By specification of the various parameters determining the force (V), it can be ensured that the moment caused by (V) is always slightly larger than the moment caused by the radial component. In this way a small excess of pre-load force keeps both flanks of the engaging teeth continually in contact with each other. Only comparatively very small displacements are required to produce the required pre-load force variation.

Because all elements determining the force (V) are approximately linear, (V) is directly proportional to the axial component, so that the pre-load force is also directly proportional thereto. Consequently, a constant percentage of excess pre-load force exists for any load. In the no-load condition, the pre-load can be equal to zero. Because of the tolerances in the dimensions of the various parts and eccentricities of the worm and the worm wheel, play may then occur in this condition. Therefore, the adjusting screw 15 is provided, which allows elimination of this play and introduction, if desired, of pre-load in the no-load condition.

Therefore, in a transmission in accordance with the invention, the additional load on the loaded tooth flank will only be slightly larger in any load condition than would be the case if no pre-load mechanism were provided. Play is completely eliminated because the worm is always firmly pressed into the worm wheel.

Because of the small additional load, friction and heat loss will be comparatively small. When the load direction of the external torque on the worm wheel is reversed, the direction of the force V will not be reversed; the relationship between V and the radial load component will remain the same, so that the transmission will be free of backlash and will have the same torsional stiffness in both load directions.

Many structural alternatives are feasible within the scope of the invention. For example, the lever 7 can be constructed to be resilient over part of its length instead of being pivotably connected to the housing, so that one movable joint can be eliminated.

The pre-load spring can be formed, instead of by a helical spring 16, by constructing part of the first member or lever 11 or 31 as a leaf spring.

Figure 2:
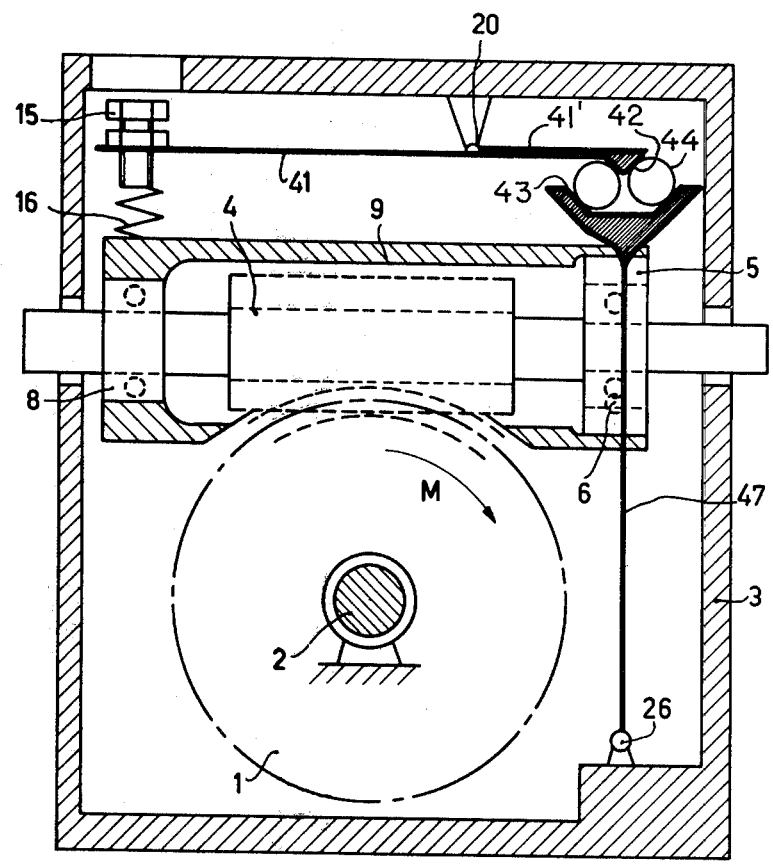
FIG. 2 is a diagrammatic sectional view of an embodiment of the invention in which the second member is movable transversely.

FIG. 2 diagrammatically shows a different embodiment having a movable second member. The second member or lever 41 is pivotably connected to the housing 3 at an area 20, and is approximately parallel to the worm axis so that portions of the lever 41 can only move perpendicular to the axial direction of the worm. When the pivot 6 is displaced under the influence of the torque M, the lever 47 which also functions as the first member will rotate about its lower pivot 26. A portion 41' of lever 41 will then be moved upwards, while pivoting about the point 20, under the influence of the inclined faces of a groove 43 in the end of the lever 47 and those of a ridge 42 on the portion 41, and the rollers 44 captured therebetween. The end of the lever 41 will then compress the spring 16, with the result that the pre-load force V increases, directly proportionally to the torque M.

I claim:

1. A worm gear transmission comprising a housing, a worm wheel journalled in the housing, two bearings, a pre-load spring, and a worm engaging the worm wheel, rotatably mounted between the bearings, a first of the two bearings being pivotably connected to the housing, and the second bearing being engaged by the pre-load spring arranged to exert a force on the second bearing which presses the worm toward the worm wheel, wherein the transmission comprises means for mounting the first bearing for displacement in the axial direction of the worm, a first member and a second member, means for connecting said second member to the housing rigidly at least in the axial direction of the worm, first coupling means for coupling said first member to said first bearing for displacement in the axial direction of the worm responsive to axial movement of said first bearing, second coupling means for coupling said first member to said second member such that displacement of said first member in said axial direction causes displacement of at least a portion of one of said members in a direction transverse to the worm axis, and means responsive to said transverse displacement for varying the pre-load force of said spring.

2. A transmission as claimed in claim 1, wherein said mounting means for the first bearing comprises a lever connected to the housing, and said pivotable connection of the first bearing to the housing comprises a pivotal connection to said lever about a first axis lying in a plane tangent to the operating pitch circle of the worm wheel at an area of engagement between the worm and the wheel, said plane also being parallel to the axis of the worm.

3. A transmission as claimed in claim 2, wherein said lever is pivotally connected to the housing about a second axis parallel to said first axis, said first and second axes lying in a plane perpendicular to the axis of the worm.

4. A transmission as claimed in claim 2, wherein said connecting means is a rigid connection preventing any relative motion between said second member and said housing.

5. A transmission as claimed in claim 1, wherein said second coupling means comprises a pair of oppositely inclined faces on one of said members, an opposed pair of oppositely inclined faces on the other of said members, and a roller located between respective ones of said pairs of opposed faces and contacting at least two opposed faces.

6. A transmission as claimed in claim 5, wherein each of said pairs of oppositely inclined faces comprises a vee-groove, with a single roller only being located between said grooves.

7. A transmission as claimed in claim 5, wherein said inclined faces comprise a vee-groove in one of said members and a ridge on the other member, and a roller located between each pair of opposed inclined faces.

* * * * *